United States Patent
Paradisi et al.

(10) Patent No.: US 7,104,028 B2
(45) Date of Patent: Sep. 12, 2006

(54) FORMING JAW FOR PRODUCING A SUCCESSION OF SEALED PACKAGES FROM A TUBE OF SHEET PACKAGING MATERIAL

(75) Inventors: Stefano Paradisi, Carpi (IT); Ivan Orsini, Formigine (IT); Roberto De Pietri, Formigine (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 50 days.

(21) Appl. No.: 10/513,404

(22) PCT Filed: May 29, 2003

(86) PCT No.: PCT/EP03/05652

§ 371 (c)(1), (2), (4) Date: Nov. 4, 2004

(87) PCT Pub. No.: WO03/101837

PCT Pub. Date: Dec. 11, 2003

(65) Prior Publication Data

US 2005/0172574 A1    Aug. 11, 2005

(30) Foreign Application Priority Data

May 31, 2002   (IT)   ............ TO2002A0470

(51) Int. Cl.
*B65B 51/14* (2006.01)
*B65B 9/06* (2006.01)

(52) U.S. Cl. ............ 53/374.5; 53/551; 53/552; 53/373.7

(58) Field of Classification Search ........... 53/548, 53/551, 552, 373.7, 374.5, 374.6, 375.9; 156/358; 493/302
See application file for complete search history.

(56) References Cited

U.S. PATENT DOCUMENTS

| | | | | |
|---|---|---|---|---|
| 4,387,547 | A * | 6/1983 | Reil | 53/551 |
| 5,155,980 | A * | 10/1992 | Mansson et al. | 53/551 |
| 5,787,681 | A * | 8/1998 | Papina et al. | 53/373.7 |
| 6,035,604 | A * | 3/2000 | Gustafsson | 53/552 |
| 6,038,838 | A * | 3/2000 | Fontanazzi | 53/551 |
| 6,167,681 | B1 * | 1/2001 | Yano et al. | 53/373.7 |
| 6,216,420 | B1 * | 4/2001 | Mazzetto et al. | 53/373.7 |
| 6,260,336 | B1 * | 7/2001 | Motomura | 53/551 |
| 6,543,205 | B1 * | 4/2003 | Faskhoody et al. | 53/373.7 |
| 6,725,634 | B1 * | 4/2004 | Palmqvist et al. | 53/548 |

FOREIGN PATENT DOCUMENTS

| | | |
|---|---|---|
| EP | 0 666 215 | 8/1995 |
| EP | 0 887 263 | 12/1998 |
| EP | 1 172 299 A1 | 1/2002 |

* cited by examiner

Primary Examiner—Louis Huynh
(74) Attorney, Agent, or Firm—Buchanan Ingersoll & Rooney PC

(57) ABSTRACT

A forming jaw for producing a succession of sealed packages from a tube of sheet packaging material filled with a pourable food product and fed in a direction parallel to its longitudinal axis is disclosed. The jaw includes sealing structure that seals a cross section of the tube; and forming structure that imparts a predetermined shape to the tube between two successive sealed cross sections. The forming structure has first and second surfaces for interacting with the tube and which extend respectively in a direction crosswise to, and in a direction parallel to, the axis of the tube. The first surface has a convex portion which exerts pressure on, to control filling of, the packages being formed.

14 Claims, 3 Drawing Sheets

US 7,104,028 B2

FORMING JAW FOR PRODUCING A SUCCESSION OF SEALED PACKAGES FROM A TUBE OF SHEET PACKAGING MATERIAL

TECHNICAL FIELD

The present invention relates to a forming jaw for producing a succession of sealed packages from a tube of sheet packaging material filled with a pourable food product.

More specifically, the present invention relates to a forming jaw which may be used on packaging machines for continuously producing sealed packages of pourable food products from said tube of packaging material.

BACKGROUND ART

Many pourable food products, such as fruit juice, pasteurized or UHT (ultra-high-temperature treated) milk, wine, tomato sauce, etc., are sold in packages made of sterilized packaging material.

A typical example of such a package is the parallelepiped-shaped package for liquid or pourable food products known as Tetra Brik Aseptic (registered trademark), which is produced by folding and sealing a web of laminated packaging material. The packaging material has a multilayer structure comprising a layer of fibrous material, e.g. paper, covered on both sides with layers of heat-seal plastic material, e.g. polyethylene.

In the case of aseptic packages for long-storage products, such as UHT milk, the packaging material also comprises a layer of oxygen-barrier material, defined for example by a sheet of aluminium, which is superimposed on a layer of heat-seal plastic material, and is in turn covered with another layer of heat-seal plastic material eventually forming the inner face of the package contacting the food product.

As is known, such packages are produced on fully automatic packaging machines, on which a continuous tube is formed from the web-fed packaging material. The web of packaging material is sterilized on the packaging machine, e.g. by applying a chemical sterilizing agent, such as a hydrogen peroxide solution, which, after sterilization, is removed, e.g. vaporized by heating, from the surfaces of the packaging material.

The web of packaging material so sterilized is maintained in a closed sterile environment, and is folded into a cylinder and sealed longitudinally to form a continuous tube. The tube of packaging material is fed in a vertical direction parallel to its axis, is filled continuously with the sterilized or sterile-processed food product, and is fed through a forming station where two or more pairs of forming jaws act cyclically and successively on the tube to seal it along equally spaced cross sections and form a continuous strip of pillow packages connected to one another by respective transverse sealing bands, i.e. extending in a horizontal direction perpendicular to the tube axis.

More specifically, according to a possible known solution, each pair of jaws is hinged at the bottom to a slide running up and down along a vertical guide parallel to the tube of packaging material, so that, as the slide moves vertically between a top dead center position and a bottom dead center position, the jaws open and close substantially "book-fashion" about the tube of packaging material.

To seal the tube of packaging material transversely, the jaws in each pair have respective sealing members cooperating with opposite sides of the tube and defined, for example, by a heating element for locally melting the mutually contacting plastic layers of the packaging material, and by one or more pressure members made of elastomeric material and for providing mechanical support to grip the tube to the required pressure.

More specifically, packaging material in which the barrier layer is defined by a sheet of electrically conducting material, e.g. aluminium, is normally heat sealed by means of a so-called induction heat sealing process, in which, when the two jaws are gripped about the tube, electric current is induced in, and locally heats, the aluminium sheet, thus resulting in localized melting of the heat-seal plastic material.

Upon completion of the heat-seal operation, a cutting member—carried, for example, by one of the two jaws—is activated and interacts with the tube of packaging material to cut it along the centerline of the transverse sealing band and so detach a pillow package from the bottom end of the tube of packaging material. The bottom end is therefore sealed transversely, and, once the slide reaches the bottom dead center position, the jaws open to avoid interfering with the upper part of the tube; and the pillow packages are fed to a final folding station where they are folded mechanically into the finished parallelepiped shape.

In one known solution described and illustrated, for example, in Patent Application EP-A-1172299, the sealing members are generally carried by respective horizontal bar portions of the jaws in each pair, which, above the bar portions, have respective open-fronted, C-section forming tabs which, following heat sealing by the relative sealing members, cooperate with each other to define a cavity of given shape and volume and which encloses and forms the tube of packaging material into a rectangular-section configuration.

More specifically, each forming tab comprises an end wall, from whose opposite lateral edges extend respective parallel lateral walls which cooperate with respective lateral walls of the other forming tab to surround the tube of packaging material.

To control filling of the pillow packages being made, the end walls of each pair of forming tabs have respective convex portions, which exert pressure on or "squeeze" the lateral walls of the packages to limit the amount of food product in and so obtain the desired weight of each package.

Though fairly effective on the whole, the above package filling control system still leaves room for further improvement.

In particular, in the case of small packages, i.e. with small-area lateral walls, to achieve the desired squeezing effect, convex portions must be used which project sharply with respect to the end walls of the relative forming tabs, and which may result in the packages being formed into unacceptable shapes. Moreover, even using sharply projecting convex portions does not ensure the desired weight of the package.

DISCLOSURE OF INVENTION

It is an object of the present invention to provide a forming jaw for producing a succession of sealed packages from a tube of sheet packaging material, designed to provide a straightforward, low-cost solution to the aforementioned drawbacks.

According to the present invention, there is provided a forming jaw for producing a succession of sealed packages from a tube of sheet packaging material filled with a pourable food product and fed in a direction parallel to its longitudinal axis; said jaw comprising sealing means for sealing a cross section of said tube, and forming means for imparting a predetermined shape to said tube between two successive sealed cross sections; said forming means comprising a first and a second surface for interacting with said tube and which extend respectively in a direction crosswise to and in a direction parallel to the axis of the tube; characterized in that said first surface comprises a convex portion which exerts pressure on, to control filling of, the packages being formed.

BRIEF DESCRIPTION OF THE DRAWINGS

A pair of preferred, non-limiting embodiments of the present invention will be described by way of example with reference to the accompanying drawings, in which.

BEST MODE FOR CARRYING OUT THE INVENTION

Figure 1:
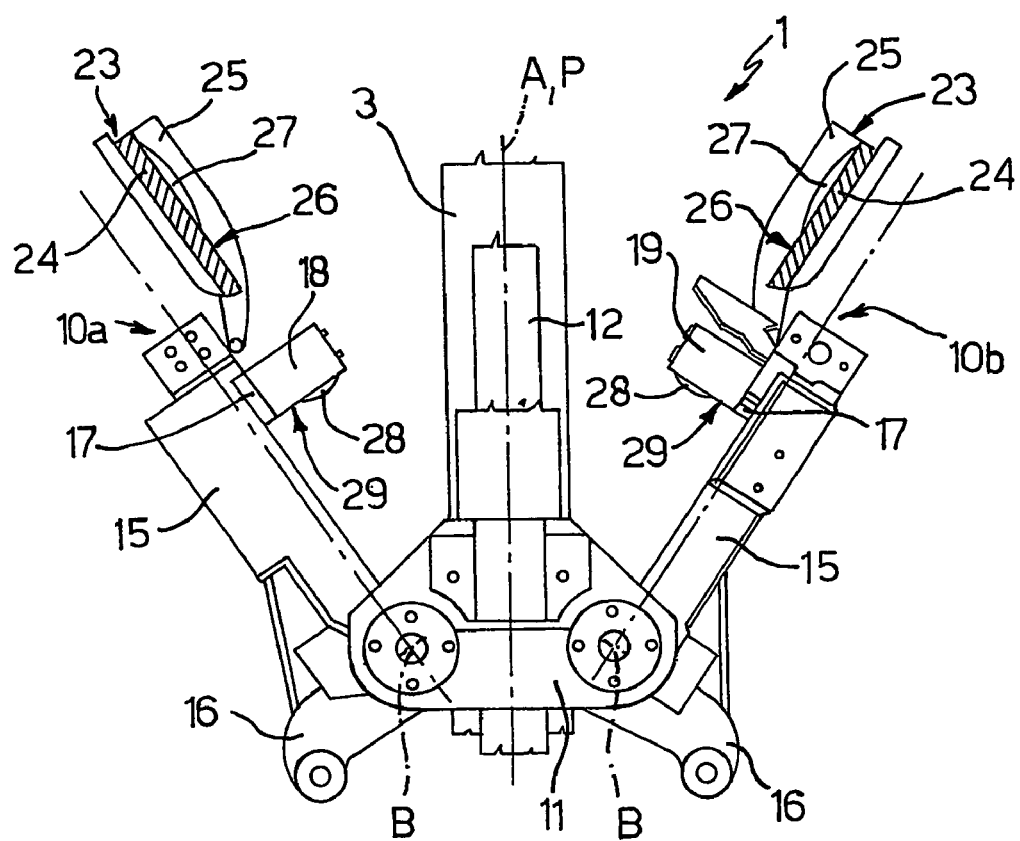
FIG. 1 shows a schematic side view of a pair of forming jaws in accordance with the invention, and acting on a tube of sheet packaging material to seal it transversely into a strip of sealed packages.

Number 1 in FIG. 1 indicates as a whole a forming station for producing a succession of sealed packages 2 of a pourable food product, such as pasteurized or UHT milk, fruit juice, wine, etc.

More specifically, station 1 may be incorporated in a packaging machine (not shown) for continuously producing packages 2 from a tube 3 of sheet packaging material.

The packaging material has a multilayer structure (not shown), and comprises a layer of fibrous material, normally paper, covered on both sides with respective layers of heat-seal plastic material, e.g. polyethylene. In the case of aseptic packages for long-storage products, such as UHT milk, the packaging material also comprises a layer of oxygen-barrier material, e.g. a sheet of aluminium, which is superimposed on a layer of heat-seal plastic material, and is in turn covered with another layer of heat-seal plastic material eventually defining the inner face of the package contacting the food product.

Tube 3 is formed in known manner upstream from station 1 by longitudinally folding and sealing a web of heat-seal sheet material, is filled with the sterilized or sterile-processed food product for packaging, and is fed by known means (not shown) in a vertical direction parallel to its longitudinal axis A.

As known, for example, from Patent Application EP-A-1172299, station 1 interacts with tube 3 to heat seal it at equally spaced cross sections into a vertical strip of pillow packages 2 connected to one another by respective transverse sealing bands 4. More specifically, station 1 heat seals each sealing band 4 along two parallel sealing lines (not shown), between which the sealing band 4 is then cut in known manner to separate packages 2.

Figure 2:
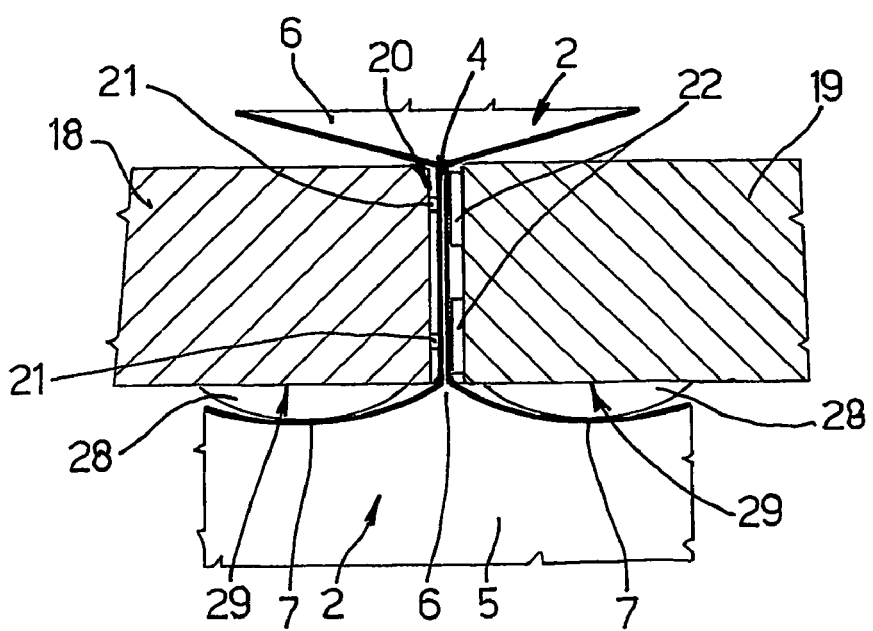
FIG. 2 shows a partly sectioned, larger-scale side view of a detail in FIG. 1.
Figure 3:
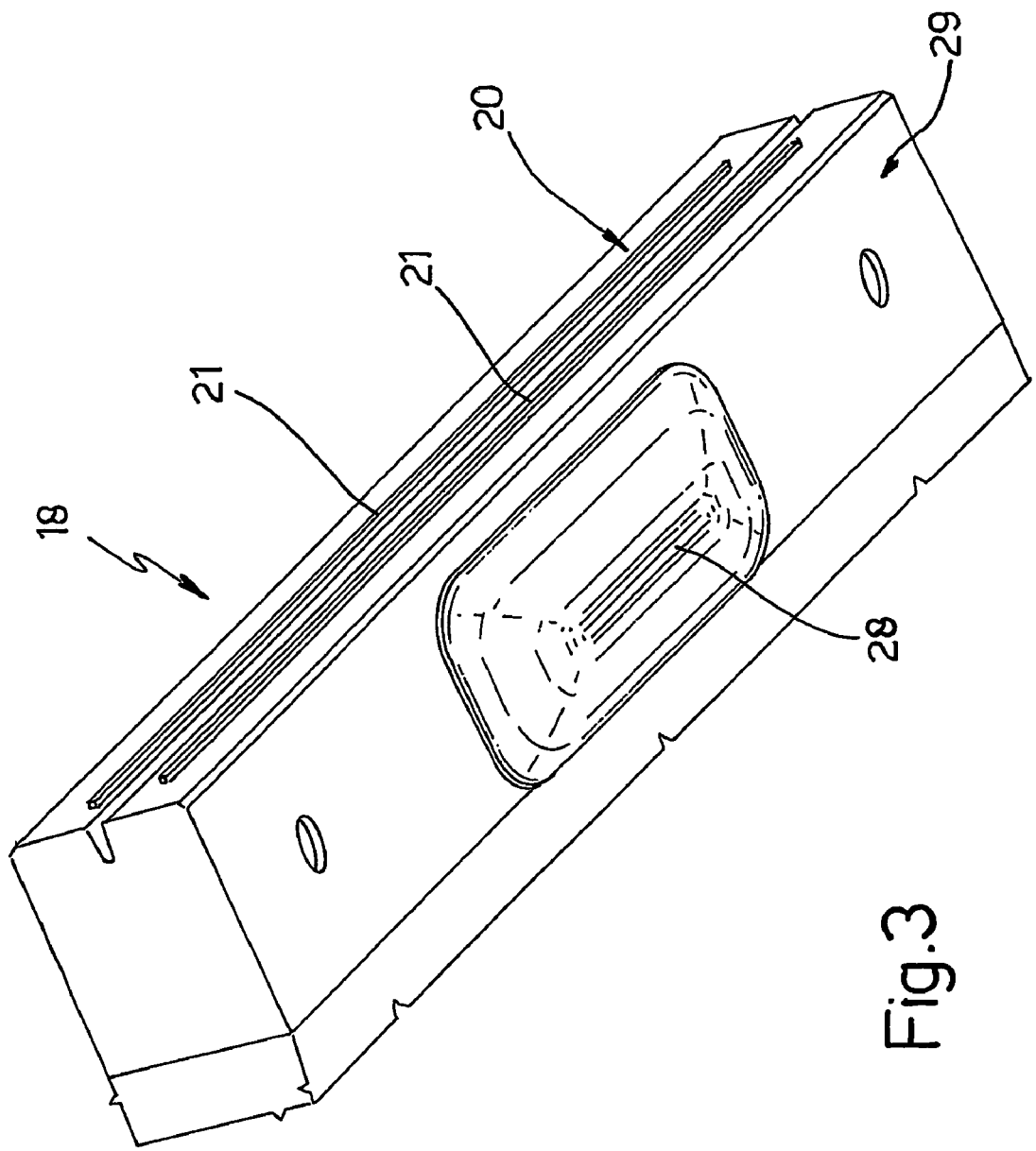
FIG. 3 shows a larger-scale view in perspective of a portion of one of the jaws in FIG. 1.

As shown partly in FIG. 2, the pillow packages 2 produced at station 1 each comprise a main portion 5 of the same shape and volume as the finished—in the example shown, parallelepiped—packages; and transition portions 6 connecting main portion 5 to the respective adjacent sealing bands 4. Each transition portion 6 is defined by two slightly inclined panels 7 extending crosswise to axis A, defining with the relative main portion 5 a flattened substantially triangular section cavity, and having a common edge from which relative sealing band 4 projects. At a follow-up folding station (not shown), the transition portions 6 of each pillow package 2 are folded onto relative main portion 5, so that panels 7 of each transition portion 6 are flattened to form an end wall of the finished package.

With particular reference to FIG. 1, station 1 comprises, in known manner, two pairs of jaws 10a, 10b (only one pair of which is shown and described in detail below) which act cyclically and successively on tube 3.

Jaws 10a, 10b in each pair are hinged at the bottom to a relative slide 11 running up and down along a relative vertical guide 12 parallel to tube 3 of packaging material. More specifically, jaws 10a, 10b in each pair extend symmetrically on opposite sides of a vertical plane P through axis A of tube 3, and are hinged to relative slide 11 about respective horizontal axes B so as to open and close substantially "book-fashion" about tube 3 as slide 11 moves up and down.

Guides 12 are located on diametrically opposite sides of tube 3, and are positioned symmetrically with respect to a plane (not shown) perpendicular to plane P and through axis A of tube 3.

The two pairs of jaws 10a, 10b interact alternately with tube 3 of packaging material to grip and heat seal it along equally spaced cross sections. The up/down movement of each slide 11 and the opening/closing movement of jaws 10a, 10b are controlled in known manner—not described, by not being necessary for a clear understanding of the present invention–by an actuating assembly (not shown) comprising pairs of vertical rods, in turn controlled by rotary cams or servomotors.

Each jaw 10a, 10b substantially comprises a main body 15, substantially in the form of a quadrangular plate, which, close to the bottom end, is hinged to relative slide 11 and supports a respective projecting actuating arm 16 cooperating with said actuating assembly.

Jaws 10a, 10b also comprise respective supporting arms 17 fixed to the top ends of respective main bodies 15, and which project from main bodies 15 in a direction parallel to respective axes B so as to be located on opposite sides of tube 3.

The projecting portions of supporting arms 17 of jaws 10a, 10b are fitted with respective sealing members 18, 19—in the example shown, in the form of parallelepiped-shaped bars—for interacting with tube 3. As shown in the accompanying drawings, sealing member 18 may incorporate, for example, an inductor 20 having two straight horizontal active surfaces 21 for generating current in the aluminium layer of the packaging material and producing localized Joule-effect melting of the mutually contacting plastic layers of the packaging material; and sealing member 19 may incorporate a pair of pressure pads 22 made of elastomeric material and providing mechanical support to grip tube 3 to the required pressure at active surfaces 21 of inductor 20.

Above respective sealing members 18, 19, supporting arms 17 of jaws 10a, 10b are fitted with respective open-fronted, C-section forming tabs 23 which, following transverse sealing by relative sealing members 18, 19, cooperate with each other to define a cavity of given shape and volume and which encloses and forms tube 3 into a rectangular-section configuration.

More specifically, forming tab 23 of each jaw 10a, 10b comprises an end wall 24, from whose opposite lateral edges extend respective parallel lateral walls 25 which cooperate with respective lateral walls 25 of forming tab 23 of the other jaw 10b, 10a to surround tube 3 of packaging material.

Each forming tab 23 therefore defines a surface 26 for interacting with tube 3 and extending in a direction parallel to axis A of tube 3.

To control filling of pillow packages 2 being made, surfaces 26 of each pair of forming tabs 23 are advantageously provided, at end walls 24, with respective convex portions 27, which exert pressure on or squeeze the opposite walls of main portion 5 of packages 2.

An important characteristic of the present invention is that each jaw 10a, 10b also has an additional convex portion 28 projecting from a surface 29, which bounds relative sealing member 18, 19, extends crosswise to axis A, and faces the opposite way to relative forming tab 23. That is, surface 29 constitutes the most downstream portion of each sealing member 18, 19 in the traveling direction of tube 3.

When forming each package 2, convex portions 28 of each pair of jaws 10a, 10b press on respective panels 7 of transition portion 6 being sealed at relative sealing members 18, 19, and, together with the action exerted by convex portions 27 of the other pair of jaws 10a, 10b on main portion 5 of package 2, squeeze package 2 so to speak to limit the amount of food product in the package and so control the weight of each package 2 leaving station 1 and, consequently, the packaging machine.

Figure 4:
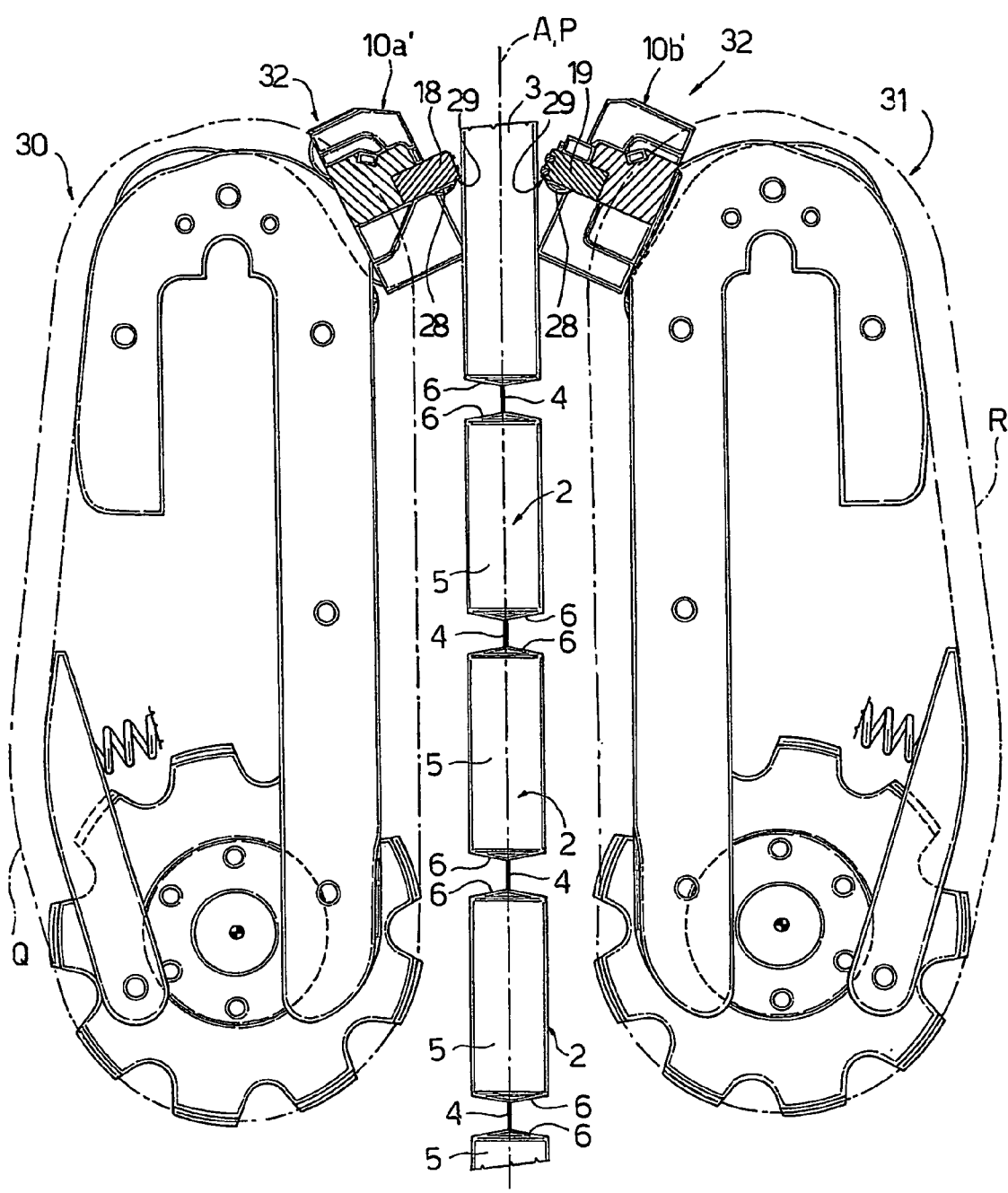
FIG. 4 shows a schematic side view of a forming station comprising a number of forming jaws in accordance with a different embodiment of the present invention.

According to a different embodiment of the present invention shown in FIG. 4, sealing members 18, 19, provided with respective convex portions 28, may be advantageously incorporated in a chain forming unit or station, indicated as a whole with number 1', of the type disclosed and described in the European patent application EP-A-0887263, which is incorporated herein by reference, in its entirety.

In particular, as is known, station 1' essentially comprises a couple of chain conveyors 30, 31 provided with respective first and second jaws 10a', 10b' (only one pair of which is shown) carrying respective sealing members 18, 19 and adapted to cooperate with each other to interact with the tube 3 of packaging material fed along axis A.

Conveyors 30, 31 define respective endless paths Q and R along which respective jaws 10a', 10b' are fed, and which extend on opposite sides of axis A.

Each conveyor 30, 31 comprises an articulated chain 32 (only partially shown), which extends along the relative path Q, R and whose links are defined by the respective jaws 10a', 10b'.

Sealing members 18, 19 may be an integral part of the body of the respective jaws 10a', 10b' or secured thereto.

Similarly to what described and shown relatively to jaws 10a, 10b, jaws 10a', 10b' may be provided, at the top thereof, with respective forming tabs 23.

The advantages of forming jaws 10a, 10b, 10a', 10b' according to the present invention will be clear from the foregoing description.

In particular, providing convex portions 28 on surfaces 29 of sealing members 18, 19 of each pair of jaws 10, 10b, 10a', 10b' in addition to convex portions 27 on forming tabs 23 enables accurate control of the squeezing pressure and final weight of packages 2 being formed, without impairing the shape of the packages. This is mainly due to additional convex portions 28 enabling the use of less sharply projecting convex portions 27 on forming tabs 23, thus eliminating the negative effects of convex portions 27 interacting with the lateral walls of small packages.

Clearly, changes may be made to forming jaws 10a, 10b, 10a', 10b' as described and illustrated herein without, however, departing from the scope of the accompanying claims.

The invention claimed is:

1. A forming jaw for producing a succession of sealed packages from a tube of sheet packaging material filled with a pourable food product and fed in a direction parallel to its longitudinal axis; the jaw comprising sealing members configured to seal a cross section of the tube, and forming members configured to impart a predetermined shape to the tube between two successive sealed cross sections; the forming members comprise a first surface and a second surface configured to interact with the tube and which extend respectively in a direction crosswise to, and in a direction parallel to, the axis of the tube, wherein the first surface comprises first and second convex portions which exert pressure on, to control filling of, the packages being formed.

2. The jaw as claimed in claim 1, wherein the second surface has a third convex portion which exerts pressure on the packages being formed.

3. The jaw as claimed in claim 1, wherein the sealing members comprise a gripping portion which interacts with the cross sections for sealing of the tube, and defining, at a downstream portion with reference to the traveling direction of the tube, the first surface.

4. The jaw as claimed in claim 3, wherein the gripping portion comprises a heater operable to heat the packaging material of the tube.

5. The jaw as claimed in claim 3, wherein the gripping portion comprises pressure pads.

6. The jaw as claimed in claim 5, which comprises a C-shaped forming tab defining, towards the tube, the second surface.

7. The jaw as claimed in claim 6, wherein the forming tab is located upstream from the gripping portion with reference to the traveling direction of the tube.

8. A forming jaw for producing a succession of sealed packages from a tube of sheet packaging material filled with a pourable food product and fed in a direction parallel to its longitudinal axis; said jaw comprising sealing means for sealing a cross section of said tube, and forming means for imparting a predetermined shape to said tube between two successive sealed cross sections; said forming means comprising a first surface and a second surface for interacting with said tube and which extend respectively in a direction crosswise to, and in a direction parallel to, the axis of the tube, wherein said first surface comprises first and second convex portions which exert pressure on, to control filling of, the packages being formed.

9. The jaw as claimed in claim 1, wherein said second surface has a third convex portion for exerting pressure on the packages being formed.

10. The jaw as claimed in claim 9, which comprises a C-shaped forming tab defining, towards said tube, said second surface having said further third convex portion.

11. The jaw as claimed in claim 10, wherein said forming tab is located upstream from said gripping portion with reference to the traveling direction of said tube.

12. The jaw as claimed in claim 1, wherein said sealing means comprise a gripping portion interacting with the cross sections for sealing of said tube, and defining, at a downstream portion with reference to the traveling direction of the tube, said first surface from which said first and second convex portions project.

13. The jaw as claimed in claim 12, wherein said gripping portion incorporates heating means for locally heating the packaging material of said tube.

14. The jaw as claimed in claim 12, wherein said gripping portion incorporates pressure means made of elastically yielding material.

* * * * *